(No Model.)
J. MACPHAIL.
FERRULE.
No. 412,033. Patented Oct. 1, 1889.
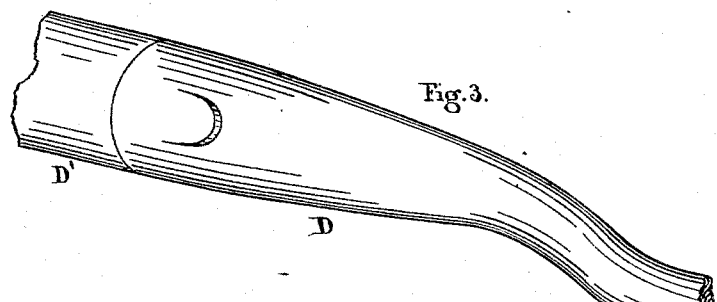
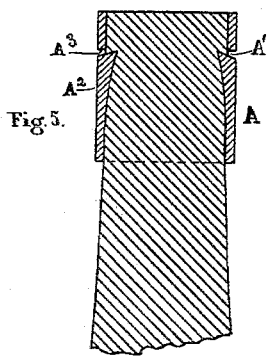
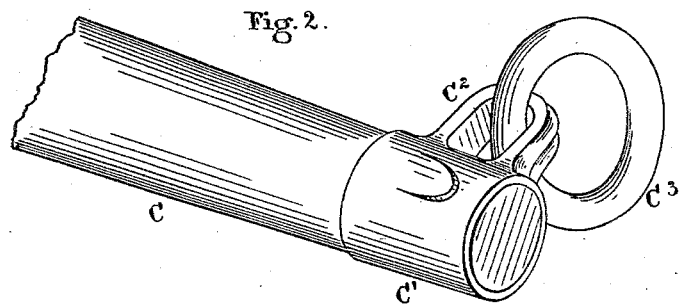
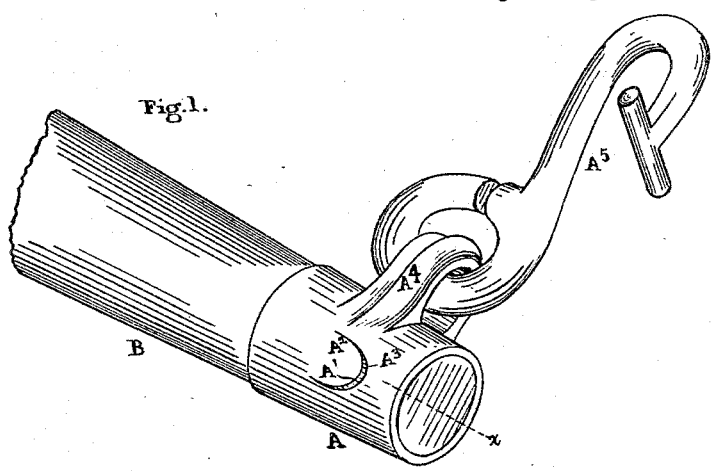
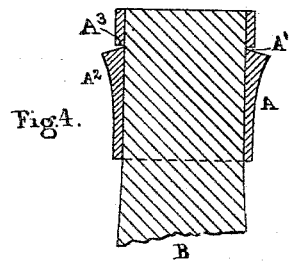
Witnesses:
P. S. Regan,
E. T. Dowling.
Inventor:
James Macphail,
per L. L. Morrison,
Attorney.

UNITED STATES PATENT OFFICE.

JAMES MACPHAIL, OF ROCKFORD, ILLINOIS.

FERRULE.

SPECIFICATION forming part of Letters Patent No. 412,033, dated October 1, 1889.

Application filed June 19, 1888. Serial No. 277,577. (No model.)

*To all whom it may concern:*

Be it known that I, JAMES MACPHAIL, a citizen of the United States, residing at Rockford, in the county of Winnebago and State of Illinois, have invented a certain new and useful Improvement in Fasteners for Ferrules, of which the following is a specification.

This invention relates to a means of securing ferrules to implements or handles of wood, and has for its object to produce a fastener for securing ferrules to the same without the use of wedges, nails, or rivets.

Figures 1 and 2 are views of ferrules secured, respectively, to a singletree and a neck-yoke by means of my improved tongue-fastener. Fig. 3 is a view of a socket secured to a handle by the same means. Fig. 4 is a view of a section, through the dotted line $x$ of Fig. 1, of a ferrule and singletree before the former is secured to the latter. Fig. 5 is a view of the same with the ferrule secured to the singletree.

Like letters of reference indicate corresponding parts throughout the several views.

A is a ferrule to be used for securing hooks to singletrees, rings to neck-yokes, or for any purpose where it is desired to secure ferrules or ferrules and attachments to implements or handles of wood.

A' is an opening, which may be situated at any point between the ends of the ferrule A, and extends transversely therethrough.

$A^2$ is a tongue-fastener formed integrally with the ferrule A and projecting into the opening A' therein from the perimeter $A^3$ thereof.

$A^4$ is a vertical eye projecting from the outside of the ferrule A and integral with the same.

$A^5$ is a singletree-hook inserted through and engaging with the eye $A^4$ of the ferrule A.

B is an end portion of a singletree.

Fig. 4 shows the ferrule A after being driven upon the end of the singletree B. Fig. 5 is the same with the tongue-fastener $A^2$ driven into the singletree B to secure the ferrule to the latter.

C is the end portion of a neck-yoke, provided with a ferrule C', which is identical with the ferrule A, and has a horizontal eye $C^2$ projecting therefrom.

$C^3$ is a ring mounted in the eye $C^2$.

D is a tool-socket secured by means of my improved tongue-fastener to the fragment of a handle D'.

The herein-described ferrule and tongue-fastener can be most advantageously manufactured by casting the same, though the fastener may be successfully formed by cutting the same out of the body of the ferrule.

Ferrules and sockets provided with the herein-described tongue-fastener can be expeditiously, firmly, and permanently secured in place thereby.

Obviously a ferrule or socket may be provided with any desired number of fasteners.

I claim—

1. A ferrule having an opening at any point between the ends thereof, extending transversely therethrough, and a tongue-fastener formed integrally therewith and projecting into said opening from the perimeter thereof, substantially as described, and for the purpose specified.

2. The ferrule A, having the tongue-fastener $A^2$ formed integrally therewith, substantially as described, and for the purpose set forth.

JAMES MACPHAIL.

Witnesses:
E. LINDAHL,
L. L. MORRISON.